Aug. 14, 1934.   W. L. McGRATH   1,969,987
STARTER DRIVE
Filed Oct. 17, 1931
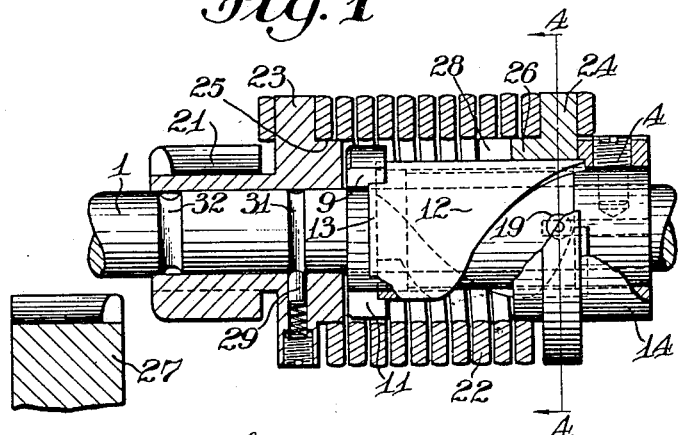
Fig. 1
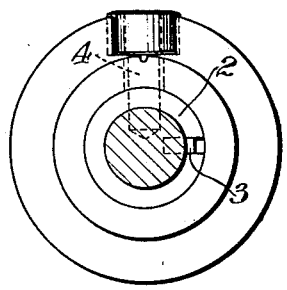
Fig. 2
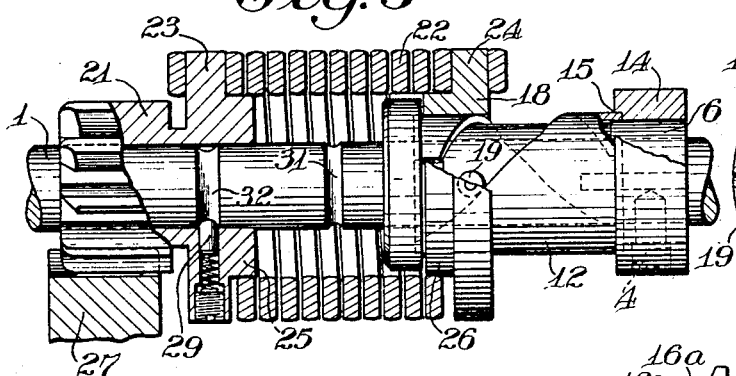
Fig. 3
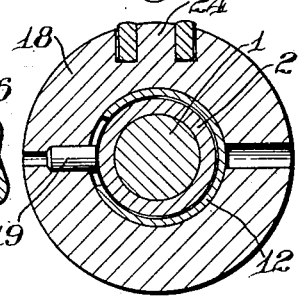
Fig. 4
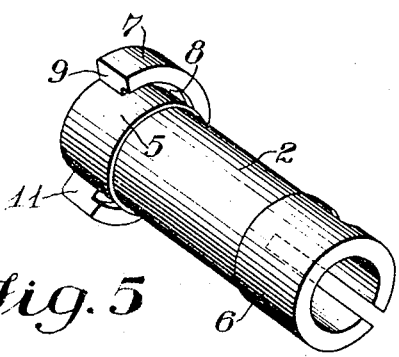
Fig. 5
Fig. 6
INVENTOR
William L. McGrath
BY Clinton S. Janes
ATTORNEY Patented Aug. 14, 1934

1,969,987

UNITED STATES PATENT OFFICE 1,969,987

STARTER DRIVE

William L. McGrath, Elmira, N. Y., assignor to Eclipse Machine Company, Elmira, N. Y., a corporation of New York Application October 17, 1931, Serial No. 569,483

10 Claims. (Cl. 74—7)

This invention relates to a starter drive and more particularly to starter gearing in which a motor driven pinion is automatically moved into driving relation with an engine gear to crank the same, and is automatically traversed out of mesh when the engine starts.

It is an object of the present invention to provide a novel automatic starter drive which is effective in operation, small in size and simple and inexpensive in construction.

Another object is to provide such a device embodying provisions for insuring easy meshing and positive demeshing of the pinion, and preventing pumping of the pinion during the cranking operation, and for preventing rebounding of the pinion when it is thrown out of mesh.

A further object is to provide such a device which is readily and economically adaptable to engines having different operating characteristics.

Further objects and advantages will be apparent to those skilled in this art from the following description taken in connection with the accompanying drawing in which:—

Fig. 1 is a side elevation partly in section of a preferred embodiment of the invention;

Fig. 2 is an end view of the same;

Fig. 3 is a view similar to Fig. 1 showing the parts in driving position;

Fig. 4 is a section taken substantially on the line 4—4 of Fig. 1;

Fig. 5 is a detail in perspective of the mounting member of the drive; and

Fig. 6 is a detail on a reduced scale of the blank from which the traversing sleeve is formed.

Referring first to Fig. 1 of the drawing, a power member in the form of a shaft 1 which may be the extended armature shaft of a driving motor, not shown, has fixed thereon a mounting member in the form of a tube 2 connected for rotation with the shaft as by means of a key 3 (Fig. 2) and maintained in longitudinal position thereon as by means of a set screw 4. The mounting member 2 is provided with seat portions 5 and 6 adjacent the ends thereof and with an arcuate flange 7 adjacent the seat 5 which is undercut as indicated at 8 and the ends of which form abutments 9 and 11 (Fig. 5). A traversing member in the form of a sleeve 12 is arranged to fit slidably on the seats 5 and 6 with one end within the undercut portion 8. A lug 13 is formed on said end of the sleeve and is arranged to fit the arcuate space between the ends 9 and 11 of the flange 7 whereby the sleeve 12 is locked against rotation on the mounting member 2. A retaining member in the form of a collar 14 is arranged to fit the seat 6 of the mounting member and to be retained thereon by means of the set screw 4. Retaining member 14 is undercut as shown at 15 to receive the outer end of sleeve 12 and confine the same on the mounting member.

Sleeve 12 as illustrated in Fig. 6 is formed from a blank of suitable sheet material the edges 16 and 17 of which define, when the blank is rolled into its sleeve form, an inclined slot traversing the sleeve lengthwise.

A control member in the form of a collar 18 is slidably journaled on the traversing sleeve 12, and is provided with suitable means such as a pin 19 arranged to project within the slot formed in said sleeve and bear against the edges 16 and 17 thereof whereby relative rotation between the sleeve and control member causes longitudinal movement of the control member.

A driving member in the form of a pinion 21 is freely mounted on the power shaft 1 and has a yielding driving connection with the control member 18 here shown in the form of a coiled spring 22 having terminal eyes embracing studs 23 and 24 formed on said driving member and control member respectively. The driving member and control member are preferably provided with axial extensions 25 and 26 respectively arranged to seat within the terminal coils of the spring to prevent distortion and assist in retaining the spring eyes upon their respective studs.

The spring 22 is adapted to transmit the longitudinal movement of the control member 18 to the driving pinion 21 to move it into and out of mesh with a member of the engine to be started such as a flywheel gear 27 and to transmit rotation from the control member 18 to the pinion to crank the engine member.

Extension 26 of the control member 18 is provided with a shoulder 28 which is arranged to be engaged by the shoulder formed by the end 11 of the arcuate flange 7 on the mounting member when the control member is at the limit of its axial movement in the direction to mesh the driving pinion with the engine gear whereby the rotation of the motor shaft 1 is transmitted directly to the control member independently of the traversing sleeve 12.

According to the present invention the contours of the edges 16 and 17 of the slot in the traversing sleeve 12 are so formed as to secure the optimum effect with regard to the automatic traversal of the pinion 21. Thus the edge 16 which cooperates with the pin 19 to traverse the pinion into mesh with the engine gear is provided for the initial portion of its length 16a with a low pitch whereby initial longitudinal movement of the pinion is effected without imparting substantial rotation thereto. The portion 16a extends to a point 16b corresponding to initial mesh of the pinion with the engine gear, and the remainder of the edge 16 is inclined at a steeper angle to the axis of the sleeve as indicated at 16c whereby a substantial rotary component of force is applied to the pin 19 causing increased friction thereof and placing a preliminary torsional stress on the spring 22 prior to the engagement of the shoulder 11 with the projection 28. This friction is also effective during the cranking operation to resist pumping action of the pinion to and from its fully meshed position caused by the accelerations of the pinion when the engine member passes over the compression points.

The edge 17 of the sleeve 12 which cooperates with the pin 19 to demesh the pinion is provided with a portion 17a of low pitch to insure the initiation of the demeshing movement, and a steeper portion 17c which tends to slow down the relative rotation between the pinion assembly and the drive shaft 1 and thus resist the tendency of the pinion assembly to bound back from idle position toward the engine member. If deemed desirable, additional means such as a detent 29 may be provided for cooperating with grooves 31 and 32 in the shaft 1, the cooperation with groove 31 resisting the rebounding tendency and any tendency for the pinion to drift into engagement with the engine gear when the starter is not operated and the groove 32 cooperating to prevent the pumping action above referred to.

It will be understood that the readily detachable mounting of the traversing sleeve 12 permits the substitution of sleeves having different contours for the edges 16 and 17 of the slot, in order to adapt the drive to engines having different characteristics with respect to pumping action, acceleration in starting, etc.

In assembling the device, the spring 22 may first be mounted on the stud 24 of the control member 18. The traversing sleeve 12 may be placed on the mounting member 2, the control member 18, with the pin 19 seated therein, threaded on said sleeve and the retaining collar 14 placed on the mounting member and retained in position by starting the set screw 4 for a thread or two into its opening. The opposite end of the spring 22 may be placed on the starting pinion 21 and the entire assembly slid on the power shaft 1. The key 3 is then inserted in the shaft, the assembly slid thereon to engage sleeve 2 with said key and the set screw 4 tightened down into its recess in the shaft.

In operation, starting with the parts in the positions shown in Fig. 1, rotation of the power shaft 1 from the starting motor causes the traversing sleeve 12 to rotate within the control member 18, which is substantially prevented from rotation by its inertia and that of the spring 22 and pinion 21. The control member, spring and pinion are thus traversed along the power shaft 1 by virtue of the pin and slot connection between sleeve 12 and member 18 until the pinion meshes with the engine gear 27, whereupon the shoulder 11 of the mounting member engages the projection 28 of the control member causing rotation of the pinion to crank the engine. When the engine starts, the acceleration thereof causes the pinion and control member to overrun, whereby the pin 19 of the control member engages the edge 17 of the slot in the traversing member 12 causing the assembly to be moved back to its idle position. If during the meshing action, a tooth of the pinion should abut end to end with a tooth of the engine gear, the spring 22 will be compressed sufficiently to allow the pin 19 to pass from the portion 16a of the edge of the slot to the portion 16c of higher pitch. A force having a high rotary component is thus applied to the pin 19 whereby the pinion assembly is caused to rotate slightly and index the pinion into proper meshing relation with the engine gear, whereupon meshing and driving occur as usual.

Although but one form of the invention has been shown and described in detail, it will be understood that various other embodiments are possible and changes may be made in the proportions and arrangements of the parts without departing from the spirit of the invention as pointed out in the claims appended hereto.

What is claimed is:—

1. A starter drive including a power member, a mounting member fixed thereon, a traversing member detachably mounted on said mounting member and interlocked therewith, a control member mounted on said traversing member and connected thereto for longitudinal movement thereof and rotary movement therewith, a driving member adapted to engage and drive a member of an engine to be started, and a driving spring interlocked at its ends to said control member and driving member.

2. A starter drive including a power member, a mounting member fixed thereon, a traversing member on said mounting member, said mounting member having a seat and a recess and said traversing member being adapted to enter said seat and having a projection arranged to enter said recess and lock said members against relative rotation, a driving member, and connections between the driving member and traversing member whereby rotation of the traversing member causes the driving member to engage and drive a member of an engine to be started.

3. A starter drive including a power member, a mounting member fixed thereon, a traversing member on said mounting member, said mounting member having a seat and a recess and said traversing member being adapted to enter said seat and having a projection arranged to enter said recess and lock said members against relative rotation, means for holding said traversing member in said seat, a driving member, connections between the traversing member and driving member whereby rotation of the traversing member causes the driving member to engage a member of an engine to be started, and a driving connection between the mounting member and the driving member established by traversal of the driving member into driving engagement with the engine member.

4. In a starter drive, a power shaft, a mounting member fixed thereon, a sleeve adapted to seat on said mounting member, means for locking said sleeve for rotation with the mounting member, a detachable means for holding the sleeve against endwise movement on the mounting member, said sleeve having an inclined slot therein, a control member slidably journaled on said sleeve and having a projection adapted to traverse said slot, a driving member and operative connections between the control member and the driving member.

5. In a starter drive, a power shaft, a driving pinion mounted thereon and means for traversing the pinion into and out of mesh with a gear of an engine to be started and for rotating the same, including a traversing member, a control member having a pin and slot connection therewith, said pin and slot being designed with a low pitch for initial actuation of the pinion in both directions and a high pitch for the subsequent actuation thereof, a positive driving connection between the power shaft and control member independent of said traversing member and a yielding driving connection between the control member and the pinion.

6. In a starter drive, a power shaft, a driving pinion mounted thereon, and means for traversing the driving member into and out of mesh with a gear of an engine to be started, and for rotating the same including a traversing member and a control member having a pin and slot connection, a yielding coupling between the control member and the driving pinion, said slot being formed with a low pitch for the distance normally traversed by the pin in moving the driving pinion into initial engagement with the engine gear and with a comparatively high pitch for the remainder thereof, said coupling being arranged to yield in case of tooth abutment between the driving pinion and engine gear whereby the pin is allowed to engage the steep portion of the slot and be turned thereby into proper meshing relation with the engine gear.

7. In an automatic starter drive of the type in which a pinion is shifted into and out of driving position by means of a pin and slot connection, a traversing sleeve formed by a strip of sheet material rolled into a cylinder, the adjacent edges of said strip being formed to define the traversing slot.

8. In an automatic starter drive of the type in which a pinion is shifted into and out of driving position by means of a pin and slot connection, a traversing sleeve formed by a strip of sheet material rolled into a cylinder, the adjacent edges of said strip being formed to define the traversing slot and means surrounding the ends of said sleeve to prevent unrolling thereof, and interlocking with said sleeve to transmit rotation thereto.

9. In a starter drive, a mounting member, a slotted traversing sleeve carried thereby, said mounting member having an undercut arcuate terminal flange, the end of said sleeve being arranged to seat in said undercut portion and having a projection arranged to bear against the ends of the arcuate flange, and detachable means for retaining said sleeve in its seat.

10. In a starter drive, a mounting member, a slotted traversing sleeve carried thereby, said mounting member having an undercut arcuate terminal flange, the end of said sleeve being arranged to seat at one end in said undercut portion and having a projection arranged to bear against the ends of the arcuate flange, and an undercut retaining collar detachably mounted on said mounting member and receiving the opposite end of said sleeve in its undercut portion.

WILLIAM L. McGRATH.